(12) United States Patent
Page et al.

(10) Patent No.: US 8,418,195 B1
(45) Date of Patent: Apr. 9, 2013

(54) ADVERTISING INSERTION FOR A VIDEO-ON-DEMAND SYSTEM

(75) Inventors: Howard G. Page, Burlingame, CA (US); Mike O'Brien, Pacifica, CA (US); Jay Cee Straley, San Carlos, CA (US)

(73) Assignee: Sprint Communications Company L.P., Overland Park, KS (US)

( * ) Notice: Subject to any disclaimer, the term of this patent is extended or adjusted under 35 U.S.C. 154(b) by 688 days.

(21) Appl. No.: 09/498,515

(22) Filed: Feb. 4, 2000

(51) Int. Cl.
*H04N 7/10* (2006.01)
*H04N 7/025* (2006.01)
*H04H 60/32* (2008.01)
*G06Q 30/00* (2012.01)

(52) U.S. Cl.
USPC .................. 725/32; 725/20; 725/36; 725/42; 705/14.4

(58) Field of Classification Search .................. 705/14.4; 725/20, 36, 42
See application file for complete search history.

(56) References Cited

U.S. PATENT DOCUMENTS

| | | | | |
|---|---|---|---|---|
| 5,822,018 A | * | 10/1998 | Farmer | 348/705 |
| 5,907,366 A | * | 5/1999 | Farmer et al. | 348/478 |
| 5,948,061 A | * | 9/1999 | Merriman et al. | 709/219 |
| 6,006,265 A | * | 12/1999 | Rangan et al. | 709/226 |
| 6,112,239 A | * | 8/2000 | Kenner et al. | 709/224 |
| 6,188,398 B1 | * | 2/2001 | Collins-Rector et al. | 725/37 |
| 6,357,042 B2 | * | 3/2002 | Srinivasan et al. | 725/32 |
| 6,487,721 B1 | * | 11/2002 | Safadi | 725/36 |
| 6,493,763 B1 | * | 12/2002 | Suzuki | 709/231 |
| 6,505,169 B1 | * | 1/2003 | Bhagavath et al. | 705/14 |
| 6,588,015 B1 | * | 7/2003 | Eyer et al. | 725/89 |
| 6,615,039 B1 | * | 9/2003 | Eldering | 455/418 |
| 6,698,020 B1 | * | 2/2004 | Zigmond et al. | 725/34 |
| 6,718,551 B1 | * | 4/2004 | Swix et al. | 725/32 |
| 6,742,183 B1 | * | 5/2004 | Reynolds et al. | 725/32 |

OTHER PUBLICATIONS

"NDS: NDS' XTV(TM) time shifting technology empowers the viewer and the broadcaster", M2 Presswire, Sep. 10, 1999.*

* cited by examiner

*Primary Examiner* — Yehdega Retta

(57) ABSTRACT

A video advertising insertion system is comprised of a processing system, interface, and video advertising. The video advertising insertion system receives a video stream carrying selected video content from a video-on-demand system. The video advertising insertion system selects and inserts video advertising into the video stream. The video advertising insertion system transfers the video stream carrying both the selected video content and the selected video advertising for display to a target viewer.

11 Claims, 3 Drawing Sheets

ADVERTISING INSERTION FOR A VIDEO-ON-DEMAND SYSTEM

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The invention is related to the field of video systems, and in particular, to a video advertising system that selects and inserts video advertising into the video content of a video-on-demand system.

2. Description of the Prior Art

Video-on-demand systems are currently being designed and implemented. The video-on-demand system offers an individual viewer various selections from a video library for viewing on-demand. Some examples of video content include movies, television shows, documentaries, news, and sports. The video-on-demand system receives a request from the individual viewer to view a particular selection from the video library. In response to the request, the video-on-demand system transfers the selected video content in a video stream to the viewer. Thus, the video-on-demand system allows an individual viewer to select video content from a video library and immediately view the selected video content.

Video advertising that is provided with the video content may be desirable in a video-on-demand system. Advertising lowers the cost of the video service and may expand the available video content selection. The viewer may also desire advertising if it is targeted properly to the individual viewer's interest.

Prior video systems, such as broadcast television, cable television, and satellite television, have limited targeting capability. Typically, these systems provide advertising based on video content and general geographic area. Viewers in the same geographic area viewing the same video content are subjected to the same video advertising. This can be a problem. For example, if neighbors are viewing the same movie, they view the same commercials. If one neighbor has a high school student and does not need another car, they may desire university advertising instead of car commercials. The other neighbor may not have children but need a car, so they may desire car commercials. Unfortunately, there is not an effective way to insert targeted video advertising along with the selected video content in a video-on-demand system.

SUMMARY OF THE INVENTION

The invention solves the above problems with a video advertising insertion system that selects video advertising for an individual target viewer based on their viewer profile and their video content selection. The viewer profile may include viewer identity or class information such as zip code. Advantageously, the system can target advertising to a specific viewer's interests.

The video advertising insertion system is comprised of a processing system, interface, and video advertising. The video advertising insertion system receives a video stream carrying selected video content from a video-on-demand system. The video advertising insertion system selects and inserts video advertising into the video stream. The video advertising insertion system transfers the video stream carrying both the selected video content and the selected video advertising for display to a target viewer.

BRIEF DESCRIPTION OF THE DRAWINGS

The same reference number represents the same element on all drawings.

DETAILED DESCRIPTION

System Configuration and Operation

FIG. 1

Figure 1:
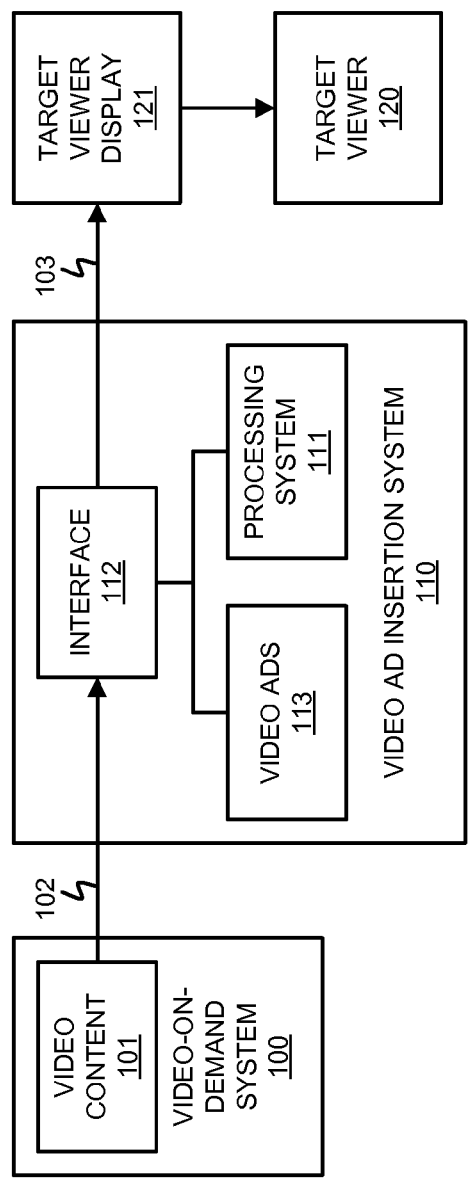
FIG. 1 is a block diagram that illustrates the configuration and operating environment for a video advertising insertion system in an example of the invention.

FIG. 1 is a block diagram that illustrates the configuration and operating environment for a video advertising insertion system 110. The video advertising insertion system 110 is comprised of processing system 111, interface 112, and a collection of video advertising 113. The video advertising insertion system 110 receives a video stream 102 carrying selected video content 101 from a video-on-demand system 100. The video advertising insertion system 110 selects and inserts video advertising 113 into the video stream 102 to generate a video stream 103. The video advertising insertion system 110 transfers the video stream 103 carrying the selected video content 101 interspersed with the selected video advertising 113 to a target viewer display 121 for the target viewer 120.

In operation, the video-on-demand system 100 offers the target viewer 120 various selections from the video content 101 for viewing on-demand. The video-on-demand system 100 receives a request from the target viewer 120 to view a particular selection from the video content 101. In response to the request, the video-on-demand system 100 transfers the selected video content 101 in the video stream 102 to the video advertising insertion system 110 for the target viewer 120.

The processing system 111 selects the particular video advertising 113 to insert in the video stream 102 based on the viewer profile for the target viewer 120 and the selected video content 101 requested by the target viewer 120. A viewer profile may include the identity of the target viewer or class information for the target viewer. Some examples of video advertising 113 include television commercials, screens, and icons. Several techniques for transferring the video advertising 113 to the video advertising insertion system 110 could be used. The interface 112 then inserts the selected video advertising 113 into the video stream 102 to generate the video stream 103. The interface 112 transfers the video stream 103 to the target viewer display 121 for viewing by the target viewer 120.

If desired, the video advertising insertion system 110 can be configured with various features. For example, the processing system 111 could disable fast forward or pause capability when the selected video advertising 113 is displayed. The processing system 111 and the interface 112 could also re-display the selected video advertising 113 after rewinding the selected video content 102.

Those skilled in the art will appreciate that some conventional components are omitted from FIG. 1 for clarity. In addition, those skilled in the art will appreciate numerous physical implementations for the video advertising insertion system 110, and that such implementations may be distributed across multiple geographically diverse components or integrated into a single component.

Distributed System

FIGS. 2-3

Figure 2:
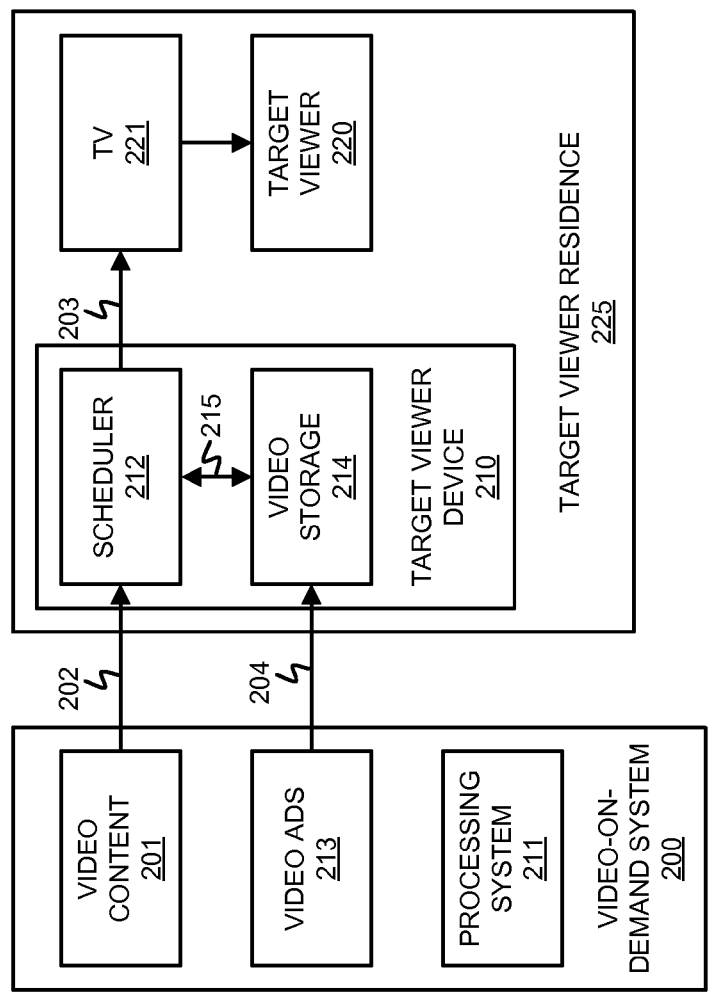
FIG. 2 is a block diagram that illustrates the configuration and operating environment of a video advertising insertion system distributed across a video-on-demand system and a target viewer residence in an example of the invention.
Figure 3:
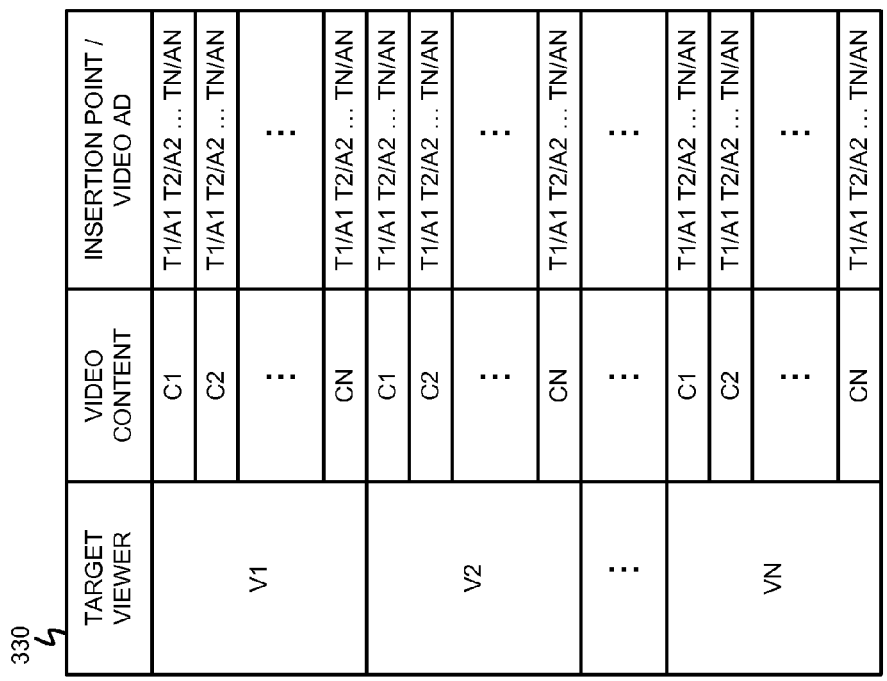
FIG. 3 is a logical table that illustrates a data structure within the processing system of a video advertising insertion system in an example of the invention.

FIGS. 2-3 depict a specific example of a video advertising insertion system in accord with the present invention. Those skilled in the art will appreciate numerous variations from this example that do not depart from the scope of the invention. Those skilled in the art will also appreciate that various features described below could be combined with the above-described embodiment to form multiple variations of the invention.

FIG. 2 is a block diagram that illustrates the configuration and operating environment of a video advertising insertion system distributed across a video-on-demand system 200 and a target viewer residence 225. The target viewer residence 225 is connected to the video-on-demand system 200 over a transport systems 202 and 204. The video-on-demand system 200 includes video content 201, processing system 211, and video advertising 213. The transport system 202 uses a faster video transfer rate than the transport system 204, so typically, the lower-speed transport system 204 is cheaper to use than the higher-speed transport system 202.

The target viewer residence 225 includes a target viewer device 210, a target viewer 220, and a television 221. The target viewer device 210 includes scheduler 212 and video storage 214. The scheduler 212 is coupled to the transport system 202 and is also coupled to the television 221 by video link 203. The video storage 214 is coupled to the transport system 204 and is also coupled to the scheduler 212 by link 215.

In operation, the video-on-demand system 200 offers the target viewer 220 various selections from the video content 201 for viewing on-demand. The video-on-demand system 200 receives and processes a request from the target viewer 220 to view a particular selection from the video content 201. In response to processing the request, the video-on-demand system 200 transfers the selected video content 201 over the transport system 202 to the scheduler 212.

The processing system 211 responds to the request by selecting particular video advertising 213 to insert based on the identity of the target viewer 220 and the selected video content 201 that is requested by the target viewer 220. The processing system 211 also determines insertion points in the selected video content 201 for the selected video advertising 213. The processing system 211 transfers the insertion points to the scheduler 212 over either the transport system 202, or the transport system 204 through storage 214 and link 215.

The video-on-demand system 200 also transfers the selected video advertising 213 over the transport system 204 to the video storage 214. If desired, the video storage 213 could provide a cache to avoid the transfer of previously transferred video advertising 213 held in the cache. In alternative embodiments, the video-on-demand system 200 could transfer the selected video advertising 213 to the video storage 214 using spare transport capacity in the transport system 202.

The scheduler 212 transfers the selected video content 201 to the television 221 over the link 203. The television 221 displays the selected video content 201 to the target viewer 220. When the scheduler 212 encounters an insertion point for the selected video content 201, the scheduler 212 interrupts the transfer of the selected video content 201 and retrieves the corresponding selected video advertising 213 from the video storage 214 over the link 215. The scheduler then transfers the selected video advertising 213 to the television 221 over the link 203. The television 221 displays the selected video advertising 213 to the target viewer 220. When display of the selected video advertising 213 is complete, the scheduler 212 resumes transfer of the selected video content 201 until the next insertion point is encountered.

FIG. 3 is a logical table that illustrates a viewer profile data structure 330 within the processing system 211. The processing system 211 enters the viewer profile data structure 330 with profile information for the target viewer (V1, V2 ... VN) and proceeds through the table using the selected video content (C1, C2 ... CN) to yield the selected video advertising (A1, A2 ... AN) and corresponding insertion points (T1, T2 ... TN). The profile information for the target viewer could be based on the viewer's identity or on the viewer's class. Examples of a class include zip code, children/no children, and various other demographics.

The viewer profile includes information about the target viewer that indicates their interests. For example, a viewer profile could indicate that the target viewer is interested in golf and country music. Video advertising related to golf and country music could be selected for the target viewer. If specific viewer profiles are used to configure the data structure 330, then the video-on-demand system can target selected advertising to each specific viewer's interests. In addition to viewer profiling, the selected video advertising could relate to the selected video content. If the target viewer is viewing a concert, then video advertising for country music could be selected.

The above-described processing systems includes instructions that are stored on storage media. The instructions can be read and executed by a processor. Some examples of instructions are software, program code, and firmware. Some examples of storage media are memory devices, tape, disks, integrated circuits, and servers. The instructions are operational when executed by the processor to direct the processor to operate in accord with the invention. The term "processor" refers to a single processing device or a group of inter-operational processing devices. Some examples of processors are integrated circuits, computers, and logic circuitry. Those skilled in the art are familiar with instructions, processors, and storage media.

Those skilled in the art will appreciate variations of the above-described embodiments that fall within the scope of the invention. As a result, the invention is not limited to the specific examples and illustrations discussed above, but only by the following claims and their equivalents.

The invention claimed is:

1. A method for providing video advertising where a video-on-demand system receives a request from a target viewer for selected video content, and in response, transfers the selected video content in a video stream to the target viewer, the method comprising:
- selecting video advertising that has a subject matter relation to the selected video content requested by the target viewer;
- determining an insertion point in the selected video content for the selected video advertising, wherein the insertion point comprises data indicating where in the selected video content the selected video advertising is to be inserted;
- transferring the selected video content to a target viewer device over a first transport system and transferring the selected video advertising to the target viewer device over a second transport system, wherein the first transport system uses greater bandwidth for video transfer than the second transport system;
- transferring the insertion point to the target viewer device over the second transport system;
- storing the selected video advertising in video storage of the target viewer device;
- transferring the selected video content in the video stream from the target viewer device to a display device;
- interrupting the transferring of the selected video content in the video stream at the insertion point;
- retrieving the selected video advertising from the video storage;
- inserting the selected video advertising into the video stream;
- resuming the transferring of the selected video content in the video stream at the insertion point; and
- disabling fast-forward capability when the selected video advertising is displayed.

2. The method of claim 1 further comprising selecting the selected video advertising based on a viewer profile for the target viewer.

3. The method of claim 1 further comprising caching the video advertising using the video storage of the target viewer device.

4. The method of claim 1 further comprising displaying the selected video content and the selected video advertising to the target viewer.

5. The method of claim 1 further comprising re-displaying the selected video advertising after rewinding the selected video content.

6. The method of claim 1 further comprising receiving the request from the target viewer for the selected video content, and in response, transferring the selected video content in the video stream to the target viewer device.

7. A video advertising insertion system where a video-on-demand system receives a request from a target viewer for selected video content, and in response, transfers the selected video content in a video stream to the target viewer, the video advertising insertion system comprising:
- a target viewer device comprising video storage;
- a processing system configured to select video advertising that has a subject matter relation to the selected video content requested by the target viewer, to determine an insertion point in the selected video content for the selected video advertising, and to disable fast-forward capability when the selected video advertising is displayed, wherein the insertion point comprises data indicating where in the selected video content the selected video advertising is to be inserted;
- a first transport system configured to transfer the selected video content to the target viewer device; and
- a second transport system configured to transfer the selected video advertising and the insertion point to the target viewer device, wherein the first transport system uses greater bandwidth for video transfer than the second transport system;
- wherein the target viewer device is configured to store the selected video advertising in the video storage, transfer the selected video content in the video stream to a display device, interrupt the transfer of the selected video content in the video stream at the insertion point, retrieve the selected video advertising from the video storage, insert the selected video advertising into the video stream, and resume the transferring of the selected video content in the video stream at the insertion point.

8. The video advertising insertion system of claim 7 wherein the video storage is configured to cache the selected video advertising.

9. The video advertising insertion system of claim 7 further comprising the display device.

10. The video advertising insertion system of claim 7 wherein the processing system and the target viewer device are configured to re-display the selected video advertising after rewinding the selected video content.

11. The video advertising insertion system of claim 7 further comprising the video-on-demand system configured to receive the request from the target viewer for the selected video content, and in response, transfer the selected video content in the video stream to the target viewer device.

* * * * *